United States Patent
Parsons et al.

(10) Patent No.: US 6,955,334 B2
(45) Date of Patent: Oct. 18, 2005

(54) REDUCED-ENERGY-CONSUMPTION ACTUATOR

(75) Inventors: Natan E. Parsons, Brookline, MA (US); Xiaoxiong Mo, Lexington, MA (US)

(73) Assignee: Arichell Technologies, Inc., West Newton, MA (US)

(*) Notice: Subject to any disclaimer, the term of this patent is extended or adjusted under 35 U.S.C. 154(b) by 0 days.

(21) Appl. No.: 10/610,954

(22) Filed: Jul. 1, 2003

(65) Prior Publication Data

US 2004/0104367 A1 Jun. 3, 2004

Related U.S. Application Data

(63) Continuation of application No. 10/037,473, filed on Oct. 19, 2001, now abandoned, which is a continuation of application No. 09/514,491, filed on Feb. 29, 2000, now Pat. No. 6,305,662, and a continuation-in-part of application No. 09/924,130, filed on Aug. 7, 2001, now Pat. No. 6,450,478.

(51) Int. Cl.[7] .................................... F16K 31/02
(52) U.S. Cl. ............................ 251/129.04; 4/304
(58) Field of Search .......... 251/129.04, 129.05; 137/554; 361/154, 155; 4/304, 406

(56) References Cited

U.S. PATENT DOCUMENTS

| | | | | |
|---|---|---|---|---|
| 1,978,737 A | * | 10/1934 | Bower et al. .............. 361/154 |
| 3,789,876 A | * | 2/1974 | Kempton et al. ............ 137/554 |
| 4,097,786 A | | 6/1978 | Lund ...................... 251/133 |
| 4,707,867 A | | 11/1987 | Kawabe et al. ......... 251/129.11 |
| 4,887,032 A | | 12/1989 | Hetrick .................... 324/207 |
| 4,894,698 A | | 1/1990 | Hijikigawa et al. ........... 357/26 |
| 5,032,812 A | | 7/1991 | Banick et al. ............... 335/17 |
| 5,109,886 A | | 5/1992 | Tauscher .................. 137/554 |
| 5,125,621 A | | 6/1992 | Parsons ................... 251/30.3 |
| 5,127,625 A | | 7/1992 | Kleinhappl .............. 25/129.17 |
| 5,169,118 A | | 12/1992 | Whiteside ................ 251/30.03 |
| 5,375,811 A | | 12/1994 | Reinicke ................ 251/129.16 |
| 5,408,369 A | | 4/1995 | Miura et al. ................ 360/75 |
| 5,433,245 A | | 7/1995 | Prather et al. .............. 137/554 |
| 5,477,149 A | * | 12/1995 | Spencer et al. ............. 137/554 |
| 5,481,187 A | | 1/1996 | Marcott et al. ......... 324/207.16 |
| 5,482,250 A | * | 1/1996 | Kodaira .................. 251/129.04 |
| 5,574,617 A | | 11/1996 | Shimanuki et al. .......... 361/154 |
| 5,583,434 A | | 12/1996 | Moyers et al. ......... 324/207.16 |
| 5,584,465 A | | 12/1996 | Ochsenreiter ............... 251/65 |
| 5,600,237 A | | 2/1997 | Nippert ................ 324/207.16 |
| 5,636,601 A | | 6/1997 | Moriya et al. ........... 123/90.11 |
| 5,708,355 A | | 1/1998 | Schrey ..................... 323/282 |
| 5,716,038 A | | 2/1998 | Scarffe ................... 251/30.03 |
| 5,747,684 A | | 5/1998 | Pace et al. .................. 73/119 |
| 5,787,915 A | | 8/1998 | Byers et al. .................. 137/1 |
| 5,797,360 A | | 8/1998 | Pischinger et al. ........ 123/90.11 |
| 5,804,962 A | | 9/1998 | Kather et al. .......... 324/207.16 |
| 5,905,625 A | | 5/1999 | Schebitz .................... 361/154 |
| 5,964,192 A | | 10/1999 | Ishii ...................... 123/90.11 |
| 5,996,965 A | | 12/1999 | Eichholz .................. 251/30.05 |
| 6,044,814 A | | 4/2000 | Fuwa ..................... 123/90.11 |
| 6,155,231 A | | 12/2000 | Adachi et al. .............. 123/399 |
| 6,158,715 A | | 12/2000 | Kirschbaum ........... 251/129.06 |
| 6,293,516 B1 | | 9/2001 | Parsons ................. 251/129.04 |
| 6,305,662 B1 | | 10/2001 | Parsons ................. 251/129.04 |

FOREIGN PATENT DOCUMENTS

| | | |
|---|---|---|
| EP | 0401468 | 12/1990 |
| EP | 0663552 A1 | 7/1995 |
| EP | 0942214 A1 | 9/1999 |
| FR | 2590088 | 5/1987 |

* cited by examiner

*Primary Examiner*—Eric Keasel
(74) *Attorney, Agent, or Firm*—Ivan D. Zitkovsky

(57) ABSTRACT

A valve system (10) includes a piezoelectric transducer (44) mounted on its housing (16). To change the valve's state, a microcontroller (54) causes a valve driver (58) to drive current through the actuator's coil (12) at a relatively high level. It continues driving current through the coil (12) at the high level until the transducer's output reaches a magnitude characteristic of the disturbance that typically results when the actuator's armature (22) reaches the end of its travel. At that point, the microcontroller (54) reduces coil drive.

19 Claims, 2 Drawing Sheets

US 6,955,334 B2

REDUCED-ENERGY-CONSUMPTION ACTUATOR

CROSS-REFERENCE TO RELATED APPLICATION

This application is a continuation of U.S. application Ser. No. 10/037,473 filed on Oct. 19, 2001, now abandoned which is a continuation of U.S. application Ser. No. 09/514,491 filed on Feb. 29, 2000, now U.S. Pat. No. 6,305,662. The Ser. No. 10/037,473 application is also a continuation-in-part of U.S. application Ser. No. 09/924,130 filed on Aug. 7, 2001, now U.S. Pat. No. 6,450,478, all of which are hereby incorporated by reference.

This application is related to commonly assigned co-pending U.S. patent application Ser. No. 09/422,553, which was filed on Oct. 21, 1999, by Parsons et al. for a Reduced-Energy-Consumption Latching Actuator and is hereby incorporated by reference.

BACKGROUND OF THE INVENTION

1. Field of the Invention

The present invention is directed to electromagnetic actuators and in particular to the systems that control them.

2. Background Information

For many automatic flow-control installations, such as automatic toilet and urinal flushers, one particularly stringent design requirement is that the system consume as little power as possible. The reason for this varies from case to case, but it is typically that the circuitry and other apparatus required to make the flusher's operation automatic are quite frequently provided on a retrofit basis. That is, manual flushers are being converted to automatic operation. Unless the retrofit unit can be battery-operated or otherwise self-contained, the installation process is quite expensive, typically requiring that walls be opened to provide the necessary wiring. That expense can be avoided if the automatic system is battery-operated, but a battery-operated system's acceptability depends greatly on battery life. A significant determinant of the battery's longevity is the energy that valve actuation consumes.

SUMMARY OF THE INVENTION

The present invention achieves this result by reducing the energy waste that usually occurs in driving the actuator's-armature. The approach employed by the invention involves determining when the armature has reached the end of its travel by taking advantage of the sound that the armature makes when it reaches that point. When that point is detected, the coil drive is changed, typically to a level that is adequate to hold the armature at its end point but less than needed to move the armature to the end point with acceptable speed. This can reduce energy consumption greatly and result in a significant battery-longevity-increase.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
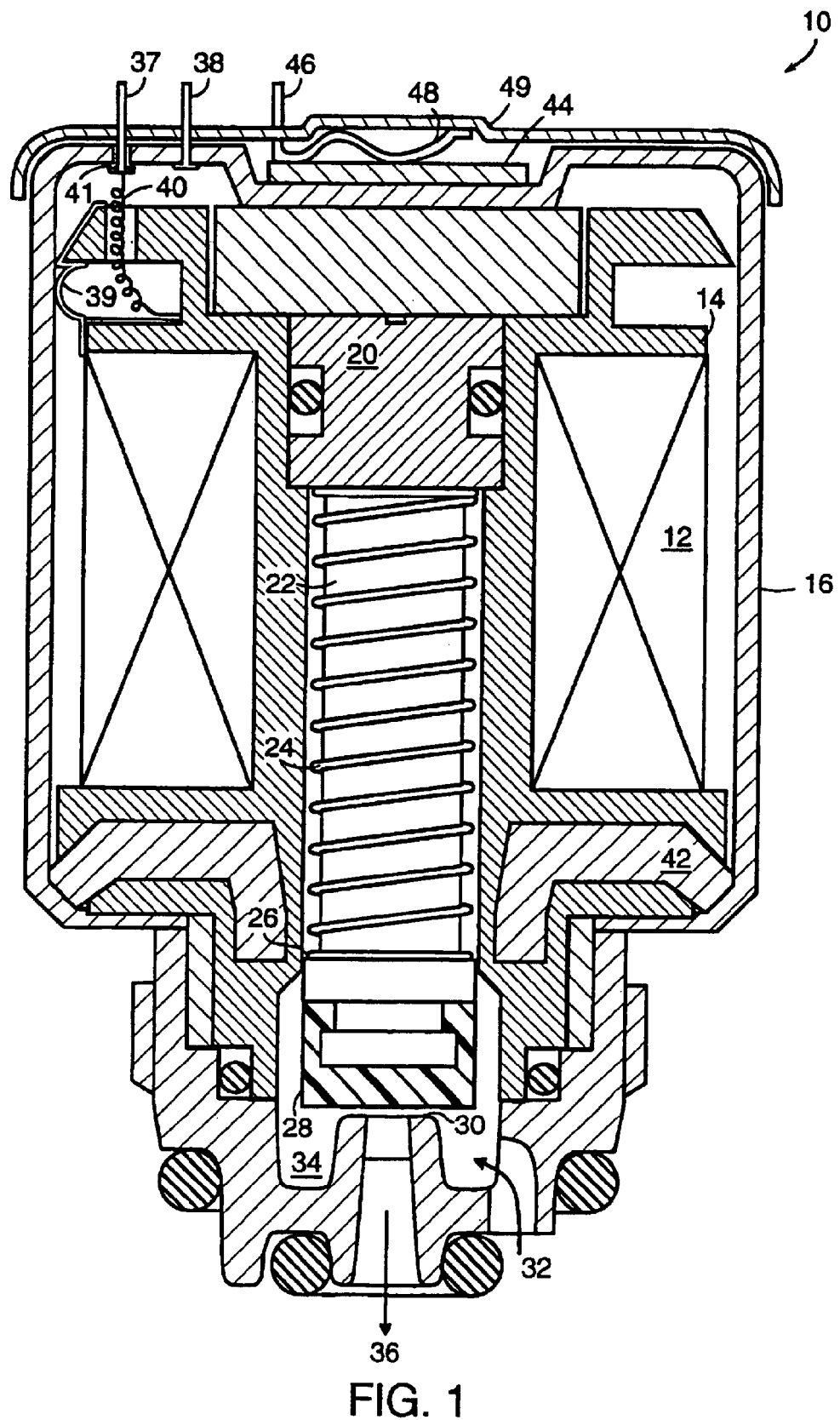
FIG. 1 is a cross-sectional view of a latching valve on which a piezoelectric transducer has been mounted.

FIG. 1 shows in cross section a valve system 10 that includes a valve actuator. The actuator includes a coil 12 wound on a bobbin 14 mounted in an actuator housing 16. In the illustrated position, the coil is being driven to hold an armature 22 in an upper position against the force that a return spring 24 exerts on a shoulder 26 formed near the armature's lower end. In the FIG. 1 position, a resilient valve member 28 at the bottom of the armature is spaced from a valve seat 30 formed about a valve inlet 32. Fluid can therefore flow through inlet 32 and an annular cavity 34 to the valve's outlet 36.

A drive voltage applied to the coil 12 through terminals 37 and 38 is what causes the current flow that holds the armature in the illustrated, open position. Terminal 38 is in ohmic contact with the conductive housing 16, which a contact spring 39 in turn connects to one end of the coil 12. A lead 40 connects the coil 12's other end to terminal 37, and a non-conducting bushing 41 insulates terminal 37 from the housing 16.

To close the valve, the drive voltage is removed, and the return spring 24 urges the valve member 28 onto the valve seat 30. To open it again, the drive is re-applied. According to the present invention, though, the coil is driven in a different mode to open the valve initially than to hold it open once it reaches the illustrated end position. The drive level applied to such actuators is usually selected to insure that the resultant force can overcome static friction and cause the change from the closed to open states to be acceptably brief. But in most cases that drive level is much greater than is needed to keep the valve open.

So keeping the same drive level whenever the valve is to be open is a waste of battery energy; the drive can be reduced after the open state has been reached. But there would still be waste even if a drive reduction were, say, made a predetermined length of time after valve drive is initially applied. Since the time required for the valve to reach the desired state can vary widely, use of a high-drive duration that is predetermined would require that the duration be relatively long so that it will be adequate for worst-case conditions. Since most actuations are not performed under worst-case circumstances, though, the high-level coil drive would typically continue for some time after the valve reaches its stable position.

To reduce the resultant energy waste, a system that employs the present invention monitors the armature to determine whether the armature has reached its endpoint, and it stops applying coil drive when that occurs. To this end, it takes advantage of the sound that the armature makes when it reaches the end of its travel.

We use the term sound here in the broad sense of a pressure or strain wave. In most embodiments, moreover, the predominant frequency components of the "sound" are typically above the audible range. The illustrated embodiment's sensor is a piezoelectric transducer 44 that responds to vibrations in the, housing wall. The piezoelectric element 44's size and shape have typically been so chosen as to maximize its response to the predominant frequency components and it normally is mounted in a location where the sounds to be detected are greatest in amplitude or most distinguishable from noise.

A terminal 46 provides electrical communication to one of the transducer 44's electrodes through a contact spring 48 that a plastic cap 49 secured to the housing holds in place. The transducer 44's other electrode can share terminal 38 with the coil because the transducer is secured to the housing 16 by conductive bonding between the housing and that electrode.

Figure 2:
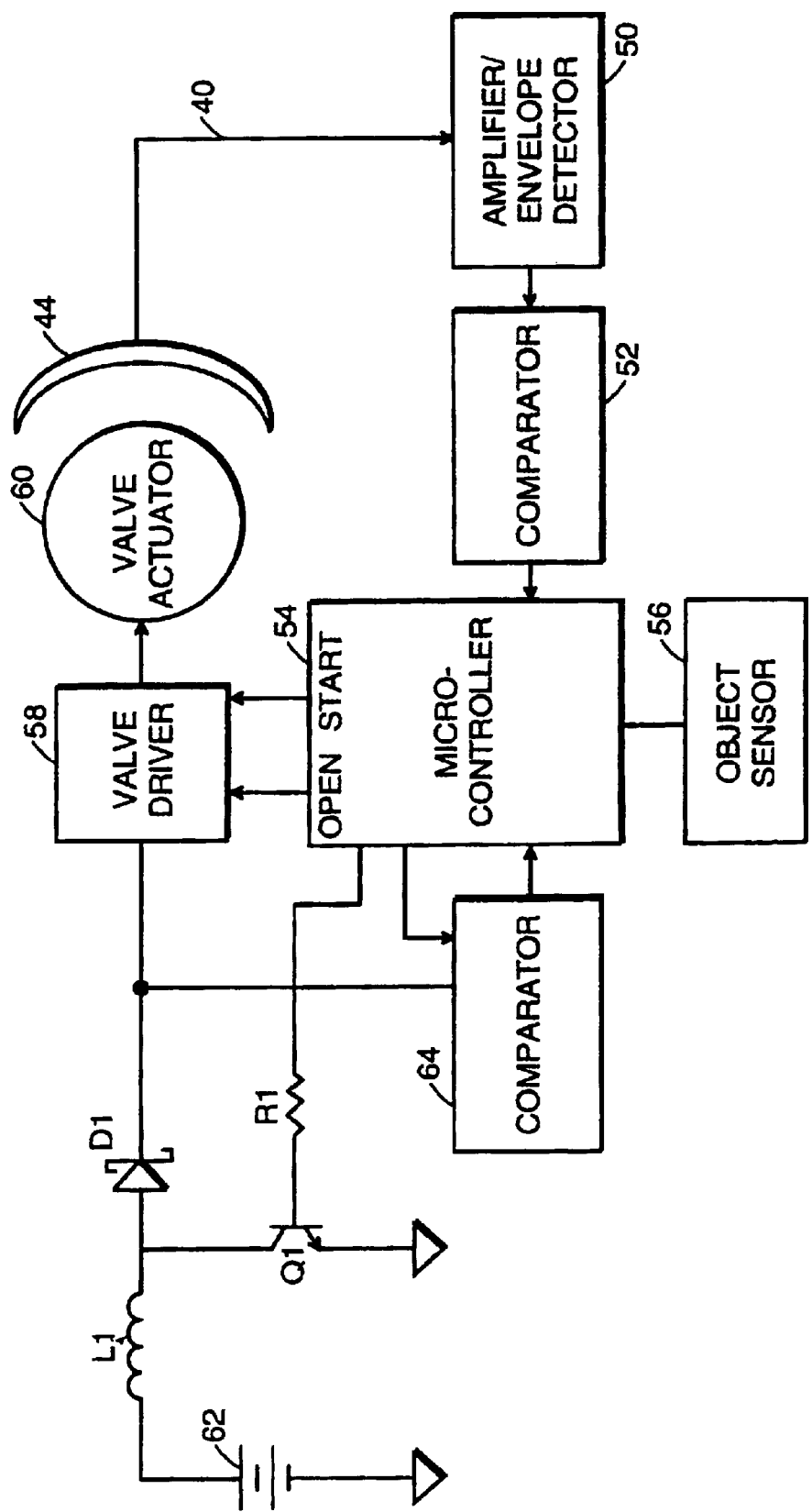
FIG. 2 is a block diagram of a control system, for the valve's actuator.

As FIG. 2 shows, a control circuit for the valve includes a sensor amplifier and envelope detector 50, which receives the transducer output. The amplifier and envelope detector 50 includes an amplifier tuned to the expected sound's predominant (typically ultrasonic-range) frequency components, rectifies the resultant filtered signal, and low-pass filters the result to produce an output representative of the tuned-amplifier output's envelope. When the armature 22 reaches an endpoint and causes housing vibration, the resultant envelope value exceeds a threshold that a comparator 52 applies.

A microcontroller 54 may operate the valve in response to triggering by an object sensor 56. For example, it may open the valve when the sensor detects user's leaving the flusher's vicinity, and it may then close it once the valve has been open for a predetermined duration. To open the valve, the microcontroller sets OPEN and START signals applied to a valve-driver circuit 58. This causes that circuit to drive current through the actuator 60's coil at a level high enough to open the valve initially.

When that current starts flowing, comparator 52's output initially indicates that amplifier 50's output is less than the threshold, so the amplifier is not receiving sound of a magnitude consistent with the armature's reaching the end of its travel. So long as this is true, the microcontroller 54 therefore-keeps the START signal asserted. But comparator 52's output changes in response to the sound made by the armature 22 at the end, of its travel. In response to this change, the microcontroller de-asserts its START output and thereby causes the valve driver 58 to reduce the coil drive to a level adequate to keep the valve open but lower than the level used to open the valve initially.

What lower level means depends on the particular drive scheme employed. One simple scheme is simply to apply a predetermined voltage to the coil. In such a scheme, a logical way to apply a lower level is simply to apply a lower voltage. In other systems, the drive is applied as a sequence of rapidly applied pulses, and the lower level would be achieved by reducing those pulses' duty cycle and/or frequency. In any event, the lower drive level results in a lower force on the armature than would have prevailed in the absence of the end-position-indicating signal.

The invention can be used to control not only the drive signal's duration but also its magnitude. A coil-drive level high enough for ordinary operation may occasionally be inadequate, and the coil-drive level can be increased if the armature fails to reach the endpoint. One way to increase the coil-drive level is to increase the voltage on capacitors discharged through the actuator coil.

FIG. 2 depicts the valve driver 58 as being powered by a battery 62. The valve driver 58 typically includes energy-storage capacitors, which the battery 62 charges up between actuations through an inductor L1 and a Shottky diode D1. When the microcontroller 54 asserts its START signal, the driver discharges the capacitors through the actuator 60's coil. Ordinarily, it is the voltage of battery 621 itself that determines the voltages to which the capacitors will be charged, and this in turns determines coil current and thus armature force.

Now, factors such as the accretion of foreign matter may make it harder than usual to open or close the valve. But energy use that normally is unnecessarily high would result if the battery voltage were set high enough to deal with such more-difficult circumstances. The illustrated embodiment therefore uses a battery-voltage level that is adequate for normal situations but not for more-difficult ones.

Instead, it increases the capacitor voltage if the armature has not reached the end of its travel within a predetermined maximum current-flow duration. Specifically, the microcontroller 54 turns the valve driver off temporarily when the predetermined maximum current-flow duration is reached, and it begins to pulse a transistor Q1 through a current-limiting resistor R1. During each pulse, the transistor draws current from the battery through inductor L1. Because of diode D1, though, it does not discharge the valve driver's capacitors. At the end of each pulse, transistor Q1 turns off, and the resultant electromotive force in inductor L1 causes current to continue to flow and thereby charge the drive circuit's capacitors through diode D2 even if those batteries' voltage exceeds that of the battery 62. So those capacitors can be charged to voltages that exceed the battery's.

To achieve the appropriate capacitor, voltage, a comparator 64 compares the capacitor voltage to a level that microcontroller 54 sets. In response to the comparator's resultant output, the microcontroller increases the pulses' duty cycle if the capacitor voltage is less than the threshold, and it decreases their duty cycle if the capacitor voltage exceeds the threshold. The threshold is set higher than the battery voltage, so the force on the armature is greater and more likely to open or close the valve when the microcontroller then turns the valve driver on again.

To close the valve, the microcontroller 54 de-asserts its OPEN output and thereby causes the valve driver 58 to remove the coil drive.

Although we have employed a simple amplitude-criterion to determine whether the armature has reached the end of its travel, other criteria may be found preferable for some applications. For instance, the sonic signal could be sampled and compared by signal processing with a stored waveform known to be characteristic of the armature's reaching its endpoint. The invention can thus be practiced in a wide range of embodiments and therefore constitutes a significant advance in the art.

What is claimed is:

1. An actuator system for use in a flusher, comprising:
   an actuator including an armature and a coil constructed to displace said armature by application of a coil drive to control operation of an automatic battery-powered flusher;
   an armature sensor constructed to detect displacement of said armature;
   an external object sensor connected to provide signal to a microcontroller;
   a battery; and
   a control circuit, including a valve driver powered by said battery, constructed to apply to said coil said coil drive, said control circuit being controlled by said microcontroller that initiates application of said coil drive upon receiving a signal originated from said external object sensor, said control circuit being also responsive to an output from said armature sensor to control duration of said coil drive.

2. The actuator system of claim 1 installed in a flusher wherein said object sensor is constructed to detect a user leaving the flusher's vicinity.

3. The actuator system of claim 1 wherein said actuator includes a permanent magnet arranged to form a latching actuator.

4. The actuator system of claim 1 wherein said actuator includes a bias spring positioned and arranged to bias said armature toward its extended position.

5. The actuator system of claim 1 wherein said armature sensor is a sound sensor coupled to a housing of said actuator.

6. The actuator system of claim 1 wherein said armature sensor is a sound sensor arranged to sense sound made by said armature reaching an end position.

7. The actuator system of claim 1 wherein said actuator is non-latching, wherein said control circuit is constructed to apply said coil drive to displace said armature to an end position from a rest position, and wherein said actuator includes a bias spring biased and arranged to return said armature to said rest position in the absence of said coil drive.

8. The actuator system of claim 7 wherein said control circuit is constructed to apply said coil drive initially at a first level and subsequently in response to said output from said armature sensor apply said coil drive at a second level.

9. The actuator system of claim 8 wherein said output from said sensor indicates said end position of said armature, and wherein said second level is smaller than said first level but great enough to keep said armature in said end position.

10. The actuator system of claim 8 wherein said output from said sensor indicates said armature is not reaching said end position, and wherein said second level is larger than said first level.

11. The actuator system of claim 1 wherein said actuator is constructed as a latching actuator including a bias spring positioned and arranged to bias said armature toward its extended position and a permanent magnet arranged to hold said armature in a retracted position, wherein said control circuit is constructed to apply said coil drive to displace said armature, and wherein said control circuit is constructed to remove said coil drive in response to said output from said sensor.

12. The actuator system of claim 1 wherein said actuator is constructed as a latching actuator including a bias spring positioned and arranged to bias said armature toward its extended position and a permanent magnet arranged to hold said armature in a retracted position, wherein said control circuit is constructed to apply said coil drive at a first level to displace said armature, and wherein said control circuit is constructed to apply said coil drive at a second level in response to said output from said armature sensor.

13. The actuator system of claim 12 wherein said sensor indicates no motion of said armature, and wherein said second level of said coil drive is larger than said first level of said coil drive.

14. A battery-operated actuator system, comprising:

an actuator including an armature and a coil constructed to displace said armature by application of a coil drive; said actuator including a permanent magnet arranged to form a latching actuator, a control circuit powered by a battery;

an armature sensor, powered by said battery, constructed to detect displacement of said armature and provide an output signal to said control circuit; and an external object sensor, powered by said battery, constructed to provide an object sensor output to said control circuit in response to an external user;

said control circuit including a valve driver powered by said battery and constructed to apply to said coil said coil drive upon receiving said object sensor output originated from said object sensor or upon receiving said output from said armature sensor, and wherein said control circuit is constructed to generate said coil drive including different power levels based upon said output from said armature sensor.

15. The battery-operated actuator system of claim 14 installed in a flusher wherein said object sensor is constructed to detect a user leaving the flusher's vicinity.

16. The battery-operated actuator system of claim 15 wherein said actuator includes a bias spring positioned and arranged to bias said armature toward its extended position.

17. The battery-operated actuator system of claim 15 wherein said armature sensor is a sound sensor coupled to a housing of said actuator.

18. The battery-operated actuator system of claim 15 wherein said armature sensor is a sound sensor arranged to sense sound made by said armature reaching an end position.

19. The battery-operated actuator system of claim 15 wherein said actuator is non-latching, wherein said control circuit is constructed to apply said coil drive to displace said armature to an end position from a rest position, and wherein said actuator includes a bias spring biased and arranged to return said armature to said rest position in the absence of said coil drive.

* * * * *